Dec. 27, 1966   A. BAUDUIN   3,294,510
APPARATUS FOR AND PROCESS OF ANNEALING
GLASS AS IT IS BEING DRAWN UPWARDLY
Filed Nov. 23, 1965   3 Sheets-Sheet 1

INVENTOR
ALBERT BAUDUIN
BY
John J. Hart
ATTORNEY

Dec. 27, 1966    A. BAUDUIN    3,294,510
APPARATUS FOR AND PROCESS OF ANNEALING
GLASS AS IT IS BEING DRAWN UPWARDLY
Filed Nov. 23, 1965    3 Sheets-Sheet 2
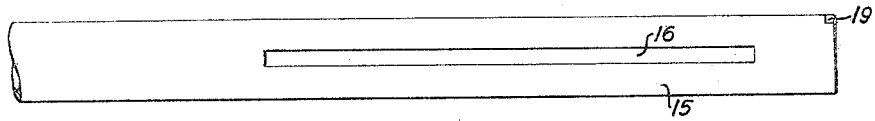
FIG. 7
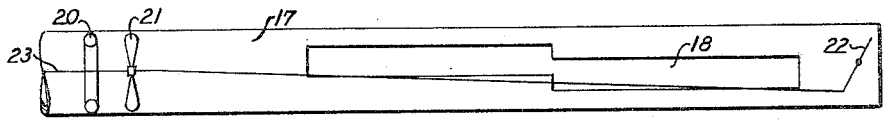
FIG. 8
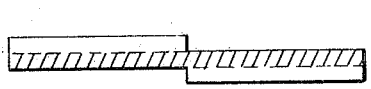
FIG. 9
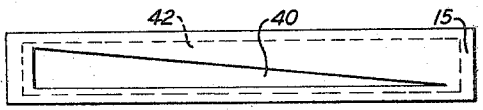
FIG. 14
FIG. 10
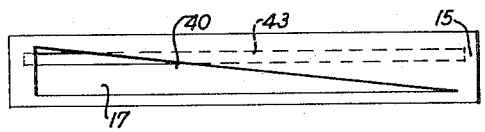
FIG. 15
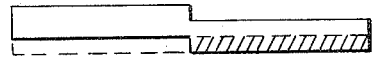
FIG. 11
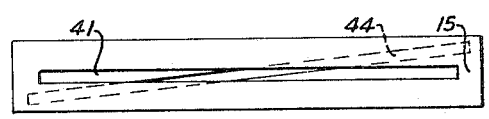
FIG. 16
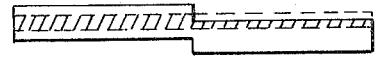
FIG. 12
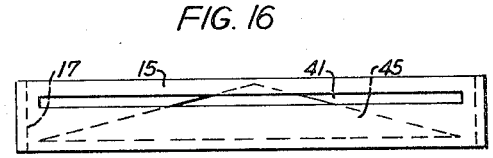
FIG. 17
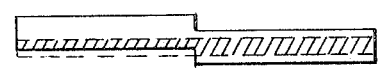
FIG. 13
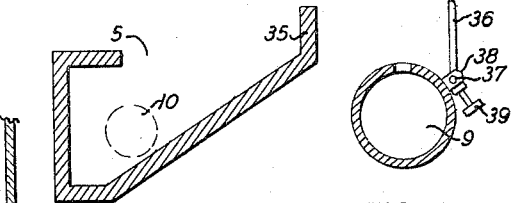
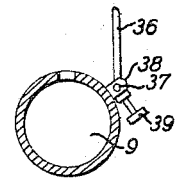
FIG. 18    FIG. 19
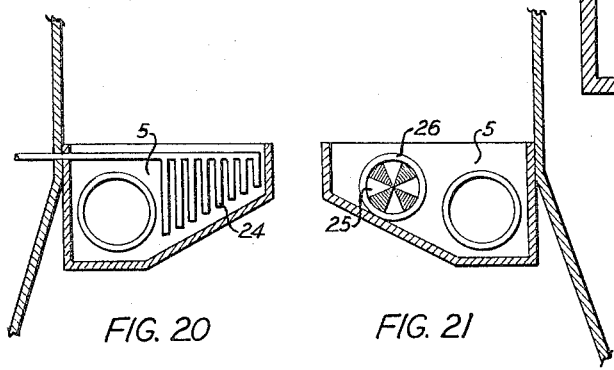
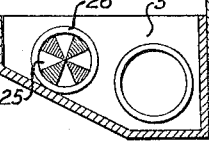
FIG. 20    FIG. 21
INVENTOR
ALBERT BAUDUIN
BY
*John J. Hart*
ATTORNEY Dec. 27, 1966   A. BAUDUIN   3,294,510
APPARATUS FOR AND PROCESS OF ANNEALING
GLASS AS IT IS BEING DRAWN UPWARDLY
Filed Nov. 23, 1965   3 Sheets-Sheet 3

INVENTOR
ALBERT BAUDUIN
BY
John J. Hart
ATTORNEY

United States Patent Office 3,294,510
Patented Dec. 27, 1966

3,294,510
APPARATUS FOR AND PROCESS OF ANNEALING GLASS AS IT IS BEING DRAWN UPWARDLY
Albert Bauduin, Jumet, Belgium, assignor to Societe Anonyme Glaverbel, Brussels, Belgium, a Belgian company
Filed Nov. 23, 1965, Ser. No. 509,404
Claims priority, application Belgium, May 20, 1960, 469,425
13 Claims. (Cl. 65—84)

This application is a continuation-in-part of my application Serial No. 110,395, filed May 16, 1961, now abandoned.

This invention relates to the manufacture of sheet glass by vertical drawing.

Apparatus for vertically drawing glass usually comprises a drawing chamber over a bath of molten glass from which bath the sheet is vertically drawn. In rising from the bath the glass passes between coolers in the drawing chamber and then into a superimposed tower comprising a vertical series of rollers which assist in lifting the glass vertically through the tower in which the glass sheet is annealed. On emerging from the tower, sometimes termed a "lehr," the glass is cut to appropriate sizes.

At the bottom of the tower catch pans are provided to catch any broken glass falling through the tower. These catch pans are accordingly at the junction of the tower and chamber, and their width is such as to afford only a narrow communication between the chamber and tower through which opening the rising glass passes into the tower.

It is well known that good annealing of the vertically drawn glass is governed by a progressive and rational cooling of the glass in its critical annealing zone, that is at the temperatures of the order of 570° C. to 480° C. for present day sheet glass. The critical annealing zone is generally speaking, situated at the level of the first few pairs of rollers at the bottom of the tower i.e., just above the catch pans.

In the process of annealing manufacturers try to obtain in the sheet glass passing through the tower a distribution of temperature such that any internal stresses which arise in the glass will not exceed a predetermined value.

In the course of vertically drawing the glass sheet the latter is at any moment at different temperatures from one point to another. In general it may be stated that taken on one and the same vertical, the temperatures generally increase as one goes lower; taken on one and the same horizontal they generally diminish from the center of the sheet towards the edges. The standard of distribution is not linear and moreover it is frequently unstable and it happens that the behaviour described above may take on very varied forms and even be reversed.

It is thus understood that it is advantageous to condition this distribution standard so that the temperature gradient along a vertical or along a horizontal will not exceed a determined value and that the shape of the temperature curve along the horizontal will assume a determined configuration.

It is generally believed that this horizontal or transverse temperature curve should correspond to an uninterrupted temperature increase from the edges to the center of the glass sheet. On the other hand it is generally preferred for the temperature difference between the center and the edges of the glass sheet (i.e. the amount of flexion of said curve) to remain between two limits. Finally it is believed that these limits, or the optimum position between the same, should vary in proportion with the rate of temperature variation observed along the vertical temperature curve at the considered place.

It is relatively easy to control the temperature gradient along the vertical by individually adjusting the spacings of the usual baffles or superposed divisions of the drawing tower. On the other hand, the gradient along the horizontal is generally poorly controlled and it is rendered unstable by the variations in the conditions of the gaseous current which obtain in the chimney formed by the tower.

Actually the lower part of the tower is always under negative pressure which creates along the sheet, parasitic currents of air fed mainly by inlets of cold air through apertures which it is not possible to block up entirely in the end walls of the tower and in the drawing chamber. This ingress of parasitic air is very harmful for a number of reasons. In the first place, since it is produced at a lower level than the annealing zone, it comes into contact with the glass at a place where it is still plastic which exerts an unfavorable effect on the surface qualities of the glass produced. Further, the condition of these currents is essentially unstable and constantly modifies the horizontal distribution of temperatures in the sheet of glass. Also as this ingress of air is produced preponderantly through apertures situated in the end walls of the drawing chamber and of the tower, it results in an increase in the cooling of the edges already normally colder than the centre of the sheet. The sheet is then in a state of stress which may exceed the permitted limits and may upset the annealing operation, thereby causing warping or bending of the sheet and at times the breakage thereof.

The primary object of the present invention is to provide a novel means and method of distributing a cooling fluid with respect to the glass sheet so that there is controlled to a desired extent, the temperature gradient across the width of the glass sheet as it moves vertically through the annealing zone, thereby reducing or eliminating the dangers which were heretofore inherent in poor annealing, such for example as warping, bending and even breakage of the sheet in the annealing tower. This supply of the gaseous cooling fluid, air for example, has the added advantage of reducing the negative pressure existing in the region of the annealing zone and, as a result, of reducing or eliminating the parasitic ingress of air and consequently the undesirable currents of air which normally form along the sheet particularly in the vicinity of the edges.

In accordance with the invention, the transverse temperature gradient of the sheet is adjusted in the annealing zone by the application in such zone of a gaseous fluid, the supply and/or temperature of which is adjustable. The gaseous fluid is preferably introduced in the middle area near the bottom of the annealing chamber, at the level where the annealing zone starts, is directed in the vertical sense, upwards, and at each point the flow thereof may be adjusted and generally the all round temperature may be adjusted with a view to removing heat from the sheet of glass, this removal being carried out according to a determined curve which may be varied.

It is advantageous to prevent the gaseous fluid admitted to the annealing zone of the tower striking the rising sheet of glass directly and thus producing thereon a too sudden action which would result in defects impairing the surface, as for example, hammer effects. To this end, the gaseous fluid admitted at the level of the first pair of rollers in the annealing zone may be deflected at least once from the straight line direction between the place where the fluid is admitted in the tower and the corresponding face of the sheet of glass or from a direction parallel or tangential to the said face.

It is advisable also to admit the gaseous fluid on each side of the sheet of glass into an enclosed space established at the foot of the annealing tower and interposed at least laterally between each of the faces of the sheet of glass and the places of admittance of the gaseous fluid into such spaces. It is preferable that the said spaces be located within the usual catch pans of the tower, and that the means for discharging the gaseous fluid into the relatively quiescent spaces defined by such catch pans be capable of being oriented in at least one angular direction and be located at one or more places in each of such catch pans in such manner as to be capable of being displaced at will to distribute the gaseous fluid along the whole width, or along one or more parts of the width of the glass sheet. By such arrangement, there is obtained the precise regulation of and control of direction of the gaseous fluid that is required to adjust the transverse temperature gradient of the rising glass sheet, and the admitted air is prevented from striking the glass and engendering a too sudden cooling action which would, as hereinbefore mentioned, lead to defective surfaces.

From the foregoing it will be observed that the present invention comprises a method of annealing a sheet of glass drawn vertically upwards from a body of molten glass through a drawing chamber, and then through an annealing tower, into which tower a gaseous fluid is introduced, for example air, in a quantity and at a temperature which may be adjusted to regulate the transverse gradient of temperature of the glass sheet, and thereby avoid warping, bending or breakage, characterized by the fact that the gaseous fluid is introduced into the tower so that the admitted fluid flows upwardly from the level where the annealing zone starts to the top thereof, whilst at the same time adjusting at each point of admission the volume and the overall temperature of the fluid so as to withdraw heat from the glass sheet according to a variable determined curve and varying this curve in the course of operation in accordance with requirements.

Preferably as hereinbefore mentioned the flow of the gases is directed so that the glass sheet cannot be struck or touched by the fluid directly after the admission of the fluid into the tower. To this end the fluid may be actually deflected at least once from the straight line direction from the place of admission of the fluid in the tower to the corresponding face of the sheet of glass or from the direction parallel to or tangential to the said face.

Preferably the deflection is effected by the stream striking on the inner walls of the catch pans.

It should be noted that the gaseous fluid taken from the outside of the apparatus is introduced and rises by the simple effect of natural draught so that the pressure inside the tower will not exceed atmospheric pressure.

The present invention also comprises apparatus for annealing sheet glass drawn vertically upwards from a molten body of glass in a drawing chamber, characterized by means for regulating the cooling of the glass as it rises through the annealing range, which means comprises pairs of tubes opposite each face of the rising glass, each tube of each pair being mounted for axial adjustment to permit selective individual location of the tube end with respect to the middle area of the rising glass, each of said tubes communicating with a supply of cooling medium and each of said tubes being disposed to direct streams from the said supply into the middle area of the rising sheet while it passes through the annealing temperature range.

The apparatus preferably comprises pairs of tubes which open into an annealing tower erected vertically above the chamber and below the level of the inner edges of the catch pans.

Accordingly to one aspect of the invention, the apparatus for annealing sheet glass drawn vertically upwards from a molten body of glass through a drawing chamber and then through an annealing tower superimposed over the drawing chamber, comprises catch pans located at the junction of the annealing tower and the drawing chamber with the end walls of the tower apertured to enable the cooling fluid tubes to pass into the catch pans, each of such tubes opening in its respective catch pan near the central area of the width of the glass, whereby on each side of the glass sheet there are provided a pair of tubes. Each of the tubes are connected to suitable means outside of the tower for supplying air through them to the central area of the glass to equalize the temperature across the glass as it rises between the two pairs of tubes, and means are provided for adjusting the positions of the tubes in the catch pans with respect to the central area of the glass.

In accordance with another aspect of the invention, the tubes are arranged side-by-side in a plane perpendicular to the plane of the glass sheet and can possibly be displaceable both at an angle to such perpendicular plane and laterally in the direction of the width of the glass sheet independently of each other or as a unit.

The walls of the tubes at their ends within the tower may be slotted to extend the central area of the tower over which the air is discharged from the tubes.

The present invention also comprehends the employment within the catch pans of an annealing tower of tubes each wall of which is slotted lengthwise and is provided with a liner which also is slotted over the same length and means permitting angular movement of each tube and liner to vary the registration of the slots in each tube and liner to regulate the effective opening for discharge of air within the catch pans and the upward direction of the discharged air.

In order that the invention may be more clearly understood reference will now be made to the accompanying present invention incorporated in vertical drawing apparatus comprising a drawing chamber and a superimposed annealing tower with catch pans arranged at the bottom of the tower, that is to say where the tower and the chamber meet.

FIGS. 7 and 8 show respectively the two principal parts of a second modification of an injection tube for the injection of gaseous fluid according to the invention;

FIGS. 9–13 show diagrammatically five different positions which the apertures of the injection tube according to FIGS. 4 and 5 may assume in relation to one another;

FIGS. 14, 15, 16 and 17 show four other forms of modifications of the cooperating apertures of the outer and inner injection tubes;

FIG. 18 is a cross section through one of the lower catch pans of the annealing tower;

FIG. 19 is an end view of an injection tube with an orientable deflecting wall;

FIG. 20 shows diagrammatically one form of the end of a catch pan according to the invention;

FIG. 21 shows diagrammatically another modification of the end of a catch pan according to the invention;

Figure 1:
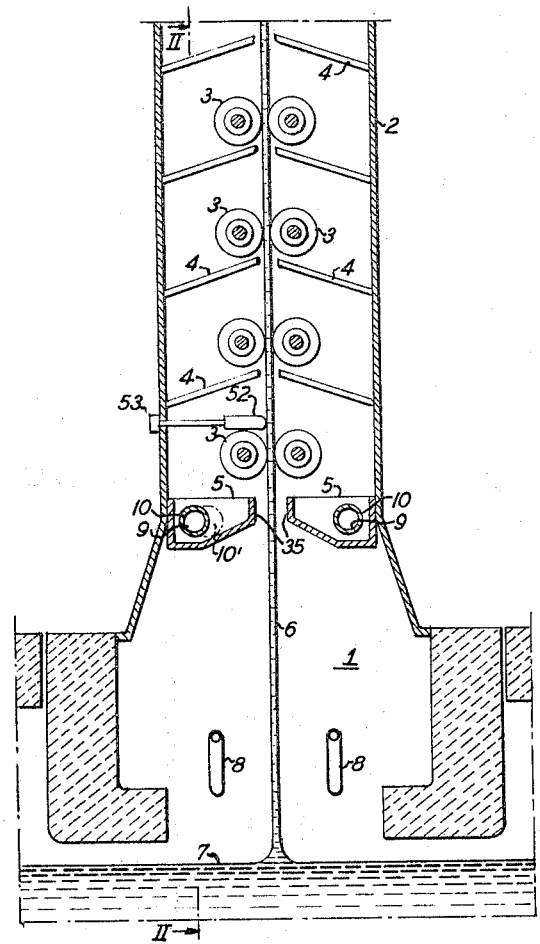
FIG. 1 is a diagrammatic view showing in vertical section along the line I—I of FIG. 2 a drawing chamber and the lower part of an annealing tower constructed in accordance with the invention.
Figure 2:
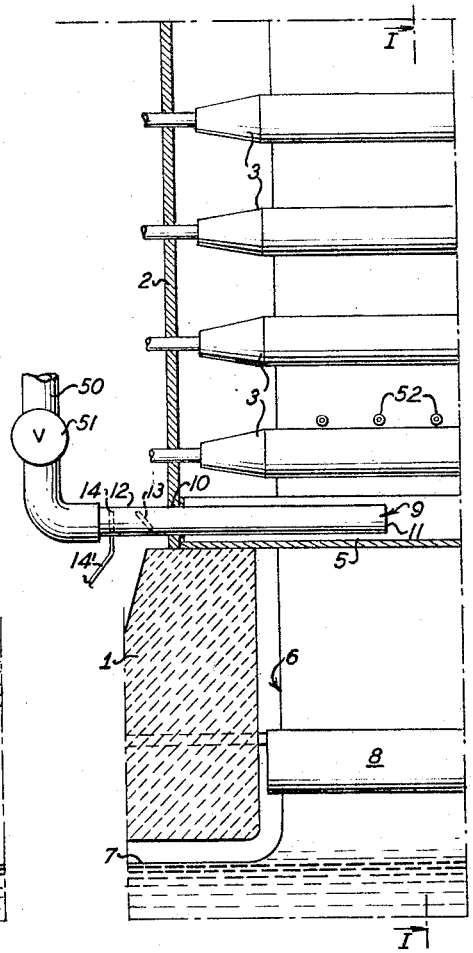
FIG. 2 is a diagrammatic vertical sectional view taken along the line II—II of FIG. 1.

FIGS. 1 and 2 show diagrammatically a drawing chamber 1 and the lower parts of a superimposed drawing machine comprising the annealing tower 2, the rollers 3, the baffles 4 and the two catch pans 5 positioned adjacent each face of the sheet of glass 6. The glass sheet is drawn vertically from the body of molten glass 7 by rollers 3 and in so doing passes between coolers 8 and then proceeds vertically up the drawing tower 2. In FIG. 2 of the drawings, approximately one half of the drawing machine and the glass sheet 6 is shown.

A simple embodiment of the invention consists in introducing into the tower, a plurality of injection tubes 9 through apertures 10 made near the bottom of the annealing tower and in both end walls of the two catch pans 5; the apertures 10 being located so that they are in spaced relation with the rising sheet. These injection tubes which are four in number and are aranged in pairs in each catch pan so that the tubes of each pair are in axial continuation of one another with their discharge ends of outlet openings 11 disposed in opposed relation, are horizontal and parallel to the sheet of glass. A support is provided which permits adjustment of and the extent of their penetration through the end walls of the catch pans at the bottom of the tower, and for angular orientation when the walls of the tubes are slotted for delivery of air into the catch pans as hereinafter explained.

Figure 3:
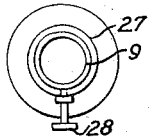
FIGS. 3, 4 and 5 show three examples of methods of fixing the injection tubes in the walls of the catch pans or the foot of the machine.
Figure 3A:
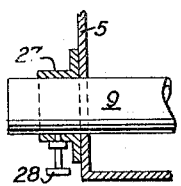
FIGS. 3a, 4a and 5a are side elevational views, partly in section, of the parts shown in FIGS. 3, 4 and 5, respectively.

As shown in FIG. 3 a metal collar 27 fixed to the end wall of the catch pans 5 concentric with the aperture made therein serves as a support and a guide for the respective injection tube 9 which is able to slide axially and rotate around its own longitudinal axis in the said collar. A set screw 28 passing through the collar 27 to the tube 9 secures the tube in any desired position of adjustment.

Figure 4:
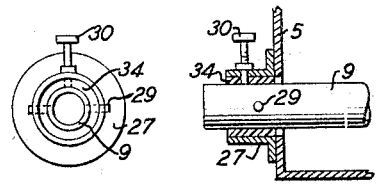
Figure 4A:
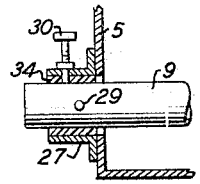

According to FIG. 4, the injection tube 9 is of a smaller diameter than collar 27 and is centered inside it where it is held by two coaxial pins 29 carried by the collar 27. Injection tube 9 may thus be tilted in a vertical plane about pivots 29 for instance to discharge a little deeper into the catch pan. A screw 30 passing through the collar enables the injection tube to be held at the desired inclination obtained by pressing on the end thereof.

Figure 5:
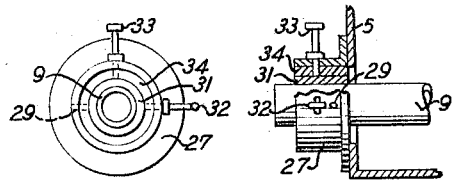
Figure 5A:
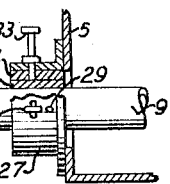

FIG. 5 shows a combination of the two foregoing systems according to which injection tube 9 can be moved at one and the same time in a horizontal sense, in a vertical angular sense and, around its longitudinal axis in a rotary sense. Pivots 29 are part of a sleeve 31 in which injection tube 9 may slide and rotate. A screw 32 fixed to the sleeve, keys the injection tube into the sleeve whilst the screw 33 supported by collar 27 gives the whole the desired inclination.

A flexible packing 34, for example asbestos cloth, introduced between collar 27 and injection tube 9 or sleeve 31 prevents the entry of parasitic air (FIGS. 4 and 5).

The length of injection tube will be at least such that its outlet aperture 11 (FIG. 2) may reach for example one third of the width of the drawn sheet but more generally its penetration into the tower will be governed by the horizontal temperature gradient which it is desired to achieve.

The inlet end 12 of the injection tube is situated outside the tower and is advantageously provided with a damper 13 in order that the quantity of air admitted into the tower may be regulated. The inlet end 12 of injection tube 9 may be open to the atmosphere, or as shown in FIG. 2, connected by a pipe 50 to a suitable source of cooling fluid, the supply of which to tube 9 is controlled by a valve 51. A plurality devices 52 for measuring the transverse temperature gradient of the glass sheet 6 may be mounted in spaced relation on one or both of the catch pans 5 and each suitably connected to temperature meters 53 mounted for example on a wall of the annealing tower 2.

These apparatuses for measuring the temperature may be of any appropriate type, for instance: thermocouples the junction of which is placed very close to the glass sheet, or thermocouples the junction of which rubs on the glass sheet (but in this case it is preferable to place the thermocouples somewhat higher in the annealing tower, where the glass surface can no longer be damaged), or optical measuring apparatuses, for instance bolometers.

Thus, by checking of the temperature meters and varying at will during the operation of the apparatus both the adjustment of the damper 13 or the valve 51, and the positions of the discharge outlets 11 of the two injection tubes 9 in each catch pan 5, it is possible to attain the desired curve of the temperatures in the glass sheet along the horizontal, and thereby correct the existing gradient in such glass sheet. It will be understood that in carrying out such steps either or both of the injection tubes 9 are longitudinally slidable in their wall supports to effect a transverse adjustment of their injection or discharge points and consequently the vertical transverse zone of the glass sheet to be cooled. As previously indicated the tubes 9 may be also angularly moved about their supports to vary the vertical positions of the outlets thereof from the horizontal. At the same time adjustment of the distribution of the cooling fluid with relation to the glass sheet may be attained by adjusting the valve 51 to vary the rate of flow of the cooling fluid and thereby vary the horizontal spreading of the injected fluid over the selected vertical transverse zone of the sheet of glass. It will be understood that this result is attained by reason of the fact that the distribution of both tubes is deflected upwardly by the action of the pull or draught prevailing in the machine.

It has been found in the practice of the invention that better results are obtained by preheating the air introduced into injection tube 9 so that the fluid will exert a less sudden cooling, thus diminishing the risk of breakage of the sheet. By measuring the temperatures of the glass as aforesaid and controlling the temperature of the preheated air in a known manner, as well as the rate of flow of such air, the operator will be able to find the temperature conditions most favorable to effect the desired correction of the existing transverse gradient in the portion of the glass sheet being treated. One of the ultimate objectives being to obtain a determined temperature difference between the centre and the edges of the ribbon or sheet, the preheating of the air introduced may be assisted or compensated by increasing the supply so that the quantity of heat extracted from the glass per unit of time remains constant. One may thus determine a distribution of the temperatures crosswise of the sheet by adjusting on the one hand the temperature of the air and on the other on the rate of supply.

The aforesaid result may be achieved according to the invention by providing for example, a burner 14 inside the tubes 9. The burner may be a circular gas burner which forms a crown of flames around the entering current of air, or any other system of regulatable heating suitable for heating the aspirated air and connected, as by a pipe 14', in a known manner to a suitable source of supply for the fuel employed in such burner.

Figure 6:
FIG. 6 shows a first modification of the outlet end of the injection tube for injection of gaseous fluid into the catch pans in accordance with the invention.

It has been found that the distribution of heated air by means of plain injection tubes 9 permits of improving the temperatures across the sheet, but the distribution of the temperatures remains fairly irregular as a result of a heavy supply of the cooling fluids at a single source, i.e., the discharge outlets 11 of such tubes. Experiments have shown that the temperature curve across the sheet is still improved if the ends of the tubes 9 are given the form of a duck's beak, as is shown in FIG. 6, so as to distribute the supply of air over a certain part of the width of the sheet. One may, of course, produce the same effect by cutting the end of tube 9 in various other ways to enable the flow of gas to be distributed over a more or less large part of the width of the ribbon.

Another more advantageous embodiment of the tube for aspiration and injection of the gaseous fluid is shown in FIGS. 7 and 8. The device consists of two concentric tubes 15 and 17; the tube 17 fitting as a liner in the outer tube, and the outer tube 15 which is open at both ends, has a longitudinal slot 16 over the whole or a part only of the section thereof situated within the drawing tower between the edges of the glass sheet. The inner tube or liner 17, shown in FIG. 8, is likewise open at both ends and has a longitudinal slot 18, for example of the same length as slot 16 of the outer tube 15, but of greater width, for example double. Each semi-length of the slot 18 is preferably offset from the other semi-length thereof by half its width. A spur 19 fixed to the end of the outer tube 15 prevents the inner tube 17 sliding longitudinally in relation to tube 15.

The inlet end of the inner tube 17 is provided on its interior with a circular gas burner 20 or any other system of heating the air drawn from the outside in the manner described with respect to the burner 14 shown in FIG. 2 of the drawings. A fixed helix 21 is advantageously placed in the inlet end of tube 17 to assure the mixing of the heated air. At the outlet end of the inner tube 17 there may also be advantageously provided a damper 22 controlled from the outside by a rod 23.

It will be understood from the foregoing, that the rotation of the inner tube in the outer tube allows adjustment of the relative positions of the slots and thus causes the form and area of the air outlet aperture along the tubes to be varied, and also causes variation of the locality in the longitudinal direction in which this outlet will be present, either wholly or partially. By such adjustment it is possible to obtain for example, the apertures shown in hatched lines in FIGS. 9 to 13. It will be understood also that the particular profiles of the slots in the inner and outer tubes are shown by way of example only. Thus, there can be utilized any other profile which is more suitably adapted for the particular conditions of operation prevailing in the tower, for example one of those shown in FIGS. 14 to 17 in which the solid lines and the broken lines represent respectively the apertures 40, 41, of the outer tubes 15 and the apertures 42, 43, 44, 45, of the inner tubes 17 and those of the inner tubes 17 or conversely. In the constructions shown in FIGS. 14, 15 and 17, relative angular movement of the tubes progressively change the effective area of the distributing slot, while in the construction of FIG. 16 the locality of distribution is continually changed though the effective area remains constant.

The adjustment of burner 20 and damper 22, combined with the aforesaid selection of the longitudinal aperture or slot in the tubes, enables a relative precise adjustment of the horizontal temperatures in the glass sheet to figures which have been previously determined. In alternative arrangements, the inner tube may be provided with the rectilinear slot 16 or 41, as the case may be, and the outer tube the offset slot 18, or the slots 43, 44 or 45, respectively.

The aforesaid longitudinal distributing slots above described should be oriented to position such that the direction of the issuing air will not cause it to come into direct contact with the sheet of glass. In the examples of tubes described above direct contact of the gaseous fluid with the sheet of glass is avoided, not only by the orientation of the outlet apertures, but also to a certain degree, by the flange 35 located on each inner wall of each catch pan 5 and running the length of the catch pan. In this connection, note especially the catch pan construction shown in FIG. 18 wherein the flange 35 extends well above the aperture 10 in the end walls and prevents air discharged by the tubes flowing directly to the rising glass.

This result may also be accomplished by providing a deflecting plate on the way of the air between the outlet aperture for the gaseous fluid and the glass sheet. Thus, as is shown in FIG. 19 of the drawings, a plate 36 may be fixed along the injection tube 9 by means of pivots 37 rotating in bearings 38. A set screw 39 in the bearings 38 keeps the plate in the desired position.

In the modifications described above, the side or end walls of the catch pan around the blowing tube are hermetically sealed. In accordance with another feature of the invention the same jets may be utilized to alter at one and the same time the temperature of the edges of the sheet. In such a construction, the end walls of the catch pans which form a hermetic closure around the tube, may be replaced wholly or partially by an adjustable burner 24 in the form of a grid or the like (FIG. 20). Also in accordance with the modification shown in FIG. 21, one may provide in the end walls of the catch pans alongside the injection tube a damper with fins 25, and a burner 26, placed behind this damper.

The adjustment of the distribution of the flow of air along the sheet of glass may be effected by apertures of very different shapes producing a differential adjustment, for example oblique slots such as 44 (FIG. 16) with curvilinear contour.

While the aforesaid description relates particularly to the employment of a pair of opposed injection tubes 9 in or above each catch pan 5, it is within the contemplation of the invention to substitute for each such tube, an assembly of two or more tubes which may or may not be contiguous or parallel and which may be of different length or cross-section and may have discharge orifices of different shape. Such compound tube assemblies will provide a better regulation of the rate of flow and the distribution of the gaseous fluid transversely of the sheet glass. These assemblies may be mounted in or above the catch pans 5 in the same manner as the aforesaid described tubes 9 and each assembly may be furnished the cooling fluid from a common source, or each tube in the assembly may be furnished cooling fluid from a different line, or course, thus making it possible to provide a different conditioning of the fluid discharged by each tube.

Figures 22, 23:
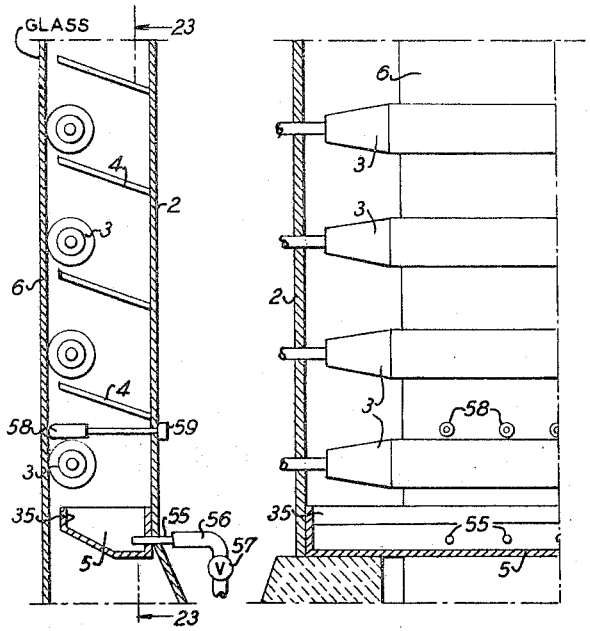
FIG. 22 is a view similar to FIG. 1 showing one half of a modified form of annealing tower embodying the invention.
FIG. 23 is a sectional view taken along the line 23—23 of FIG. 22.

As previously indicated, it is also within the contemplation of the invention to provide in each catch pan 5 a series of spaced injection tubes or nozzles arranged in a horizontal row along each face of the glass sheet and disposed perpendicularly to such faces of the glass sheet. An apparatus having the injection tubes so arranged is shown in FIGS. 22 and 23 of the drawings wherein the reference numeral 55 designates each of the injectors in the two series. The injectors 55 may be each mounted to be displaced longitudinally thereof, or at an angle to a plane perpendicular to the plane of the glass sheet in the manner described with respect to the injector tubes 9, or to be so adjusted as a unit by mounting them on a common support member. The injectors 55, as well as the injectors 9 may also be mounted so as to be displaceable laterally by providing the openings 10 therefore in the form of slots as is indicated by the opening 10′ shown in dotted outline in FIG. 1 of the drawings. In this connection, the injectors 55 may be mounted on a common support which is displaceable laterally to displace such injectors 55 laterally in the direction of the width of the glass sheet as a unit. Each of the injectors 55 may be connected individually to a suitable source of cooling fluid as by the pipe 56 shown in FIG. 22 of the drawings. The rate of flow of fluid from the injectors 55 may be controlled by dampers in the manner of the damper 13 shown in FIG. 2 or by valves 57 in FIG. 22, or both to effect any desired rates of flow of the fluid therethrough or to provide for uniform or non-uniform distribution of such flows over the width on the glass sheet. Also each of the injectors 55 may have associated therewith a temperature measuring device 58 conected to a temperature meter 59 mounted for instance on a side of the annealing tower 2.

It will be understood that the construction disclosed in FIGS. 22 and 23 of the drawings, possess the advantage that the glass sheet may be more readily treated to control the transverse temperature curve therein in any manner desired. Thus, the customary gradient found in the glass may be modified to produce less pronounced temperature differences in the glass sheet, or to effect an inversion of the customary gradient, or to provide a given non-uniform transverse temperature gradient in the glass sheet and thereby effect more pronounced changes in the gradient in certain portions of the width of the glass than in other portions thereof.

Figure 26:
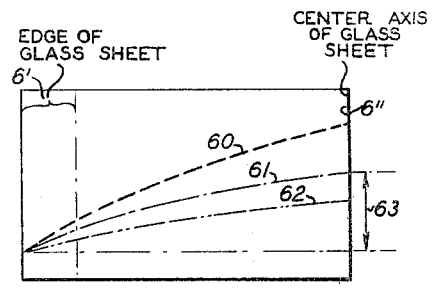
FIG. 26 is a graph of the transverse temperature gradient curves in a glass sheet.

Referring now to FIGS. 26 to 29 of the drawings, the curve 60 in FIG. 26 indicates the customary transverse temperature curve existing in a glass sheet, i.e., lowest at the edge of the glass sheet and rising steadily toward the center of the sheet. The purpose of the method and apparatus of this invention is ordinarily to improve the temperature curve as desired, the temperature being reduced below the temperatures which exist in the glass sheet before the gradient is corrected. The curve 61 in FIG. 26 indicates the gradient condition ordinarily desired for satisfactory annealing of the glass. However, as above explained any desired variation of the customary temperature curve may be effected in the practice of the invention determined by conditions and the results desired. Thus, as is indicated in FIG. 26 such extracted heat should preferably not cause the temperature curve to fall below the curve 62, nor to be above the curve 60, but should be in the neighborhood of the curve 61 with the arrow 63 indicating the temperature difference between the center of the glass sheet and the edges thereof.

Figure 27:
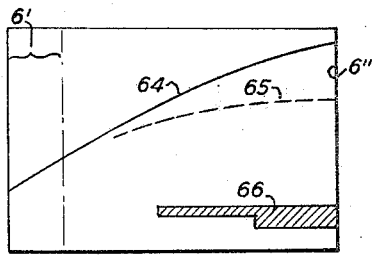
FIGS. 27, 28 and 29 illustrate how different applications of the cooling fluid act on different transverse temperature gradient curves.

FIG. 27 indicates how in the practice of the invention, the transverse temperature gradient of a sheet of glass, as represented by the curve 64, may be lowered to the dotted line curve 65 by the injection of cold air at a high rate at the center of the glass sheet and possibly with a lower rate in the regions of the glass sheet adjoining the central region thereof; the block 66 indicating the rate of air flow applied at such central and adjoining regions.

Figure 28:
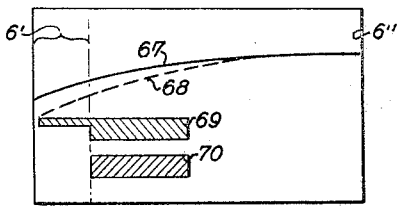

FIG. 28 illustrates how the temperature gradient of the glass sheet, as represented by the curve 67, may be modified to the dotted line condition 68 at the edges of the glass sheet and in the zones of the sheet adjacent such edges, by the injection of air represented by the blocks 69 or 70, that is, with a low rate at the edges as indicated by the block 69, or without such injection at the edges as indicated by the block 70, and with the main rate of injection in the zones adjacent to the edges.

Figure 29:
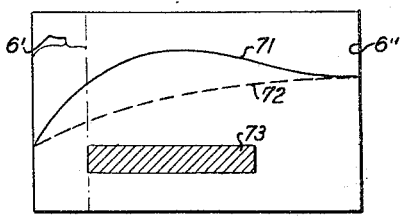

FIG. 29 illustrates how lateral maximum in the temperature curve of the glass sheet, as represented by the curve 71 may be eliminated as indicated by the dotted line curve 72 by applying an injection in a controlled quantity in the zone of the lateral maximum as indicated by the flow rate block 73.

Figures 24, 25:
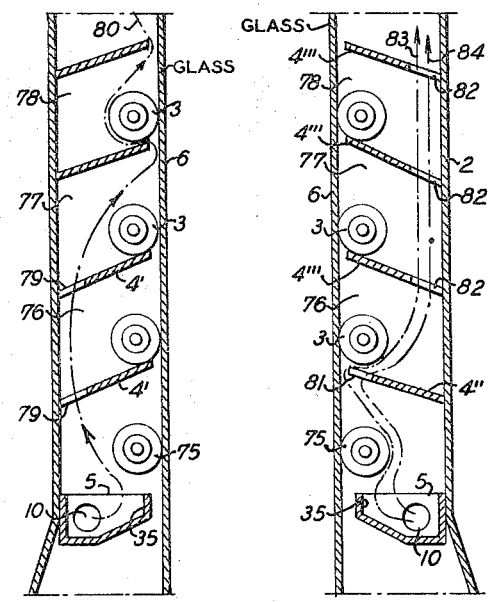
FIGS. 24 and 25 are views similar to FIG. 22 and illustrating how the invention may be employed to treat the glass sheet at places in the annealing tower substantially above the catch pans.

It has also been found that if the thickness of the glass and simultaneously the speed of the drawing operation are voluntarily changed it is also necessary to vary the level at which the temperature gradient is to be corrected as repersented by the arrow 63 in FIG. 26. Accordingly, it may be advisable instead of treating the glass initially to the cooling fluid in the region of the first pair of rollers 75 in the annealing tower, to effect such treatment in either the regions 76, 77 or 78 of the tower. This variation in the application of the treatment vertically to the glass sheet is made possible because of the feature of not injecting the cooling fluid directly towards the glass sheet and by varying the construction and arrangement of the plates 4 to the advantage of this feature or characteristic of the invention. Thus, for example, if it is desired to treat the glass in the zones 77 and 78 of the annealing tower, the plates 4', 4' in FIG. 24 are provided with openings 79 adjacent to the tower wall and are closed against their associated rollers 3. As a result the cooling air discharged into the catch pan 5 is forced to pass up along the tower wall and through the openings 79 in the two plates 4', 4' and then to pass upwardly near the glass sheet in the regions 77 and 78 in the manner indicated by the flow line designated 80. Contrary-wise if it is desired that the cooling fluid treat the glass sheet in the region between the rollers 75 and the rollers in the zone 76 (FIG. 25), the plate 4'' may or may not be provided at its outer end with an opening 81, and the three upper plates 4''' provided with openings 82 adjacent to the tower wall and arranged with relation to their associated rollers so that the spaces therebetween are closed, as illustrated in FIG. 25. With such an arrangement, the cooling air will flow along the lines designated 83 and 84 to treat the glass in the desired region only.

While I have hereinabove described and illustrated in the accompanying drawings, various manners in which my invention may be practiced, it will be apparent to those skilled in the art that modifications thereof may be made without departing from the spirit of the invention or the scope of the appended claims.

I claim:

1. The process of annealing sheet glass drawn upwardly through a drawing chamber from a body of molten glass and having transverse temperature curves established therein during its movement through the drawing chamber, which comprises drawing the formed sheet up through an annealing zone located adjacently above the drawing chamber, introducing a cooling gas into the lower section of such annealing zone so that such gas is diffused upwardly from the place of discharge thereof into such zone, the cooling gas being supplied to such lower section within an area thereof spaced inwardly from the side edges of the glass sheet and so that it is distributed in a non-uniform manner along an elongated region located in spaced, substantially parallel relation to the adjacent surface of the glass sheet, and controlling the ascent of the cooling gas so that it rises from such region in an ascending transversely non-uniform flow along the upwardly moving portion of the glass sheet and so as to withdraw heat from such glass sheet that the cooling action is greater in the central portion of the sheet than on the side edges thereof as to produce a transverse temperature curve in such glass sheet portion different from that established therein the upper portion of the drawing chamber.

2. The process defined in claim 1, in which the cooling gas is supplied along the elongated region at flow rates conforming to a given distribution curve determined by the differences between the observed transverse temperature curve of the glass sheet and the transverse temperature curve to be established by such cooling gas in the glass sheet.

3. The process defined in claim 1, in which the cooling gas is fed into an elongated confined space in said elongated region and the flow thereof is diverted from the direction of its entry into such space before passing from such confined space into the lower section of the annealing zone so that such cooling gas will not directly impinge against the glass sheet.

4. Apparatus for annealing sheet glass as it is being drawn upwardly through a drawing chamber from a body of molten glass and having transverse temperature curves established therein during its movement through the drawing chamber, comprising an annealing tower positioned adjacently above the drawing chamber, means for drawing the glass sheet upwardly through said tower, means for introducing a cooling gas into the lower section of said tower within an area thereof spaced inwardly from the side edges of the glass sheet and including elongated means in said lower section disposed in spaced relation to the rising glass sheet and in substantially parallel relation to such glass sheet, said elongated means being constructed and arranged to diffuse the cooling gas upwardly from the place of discharge thereof into said elongated means and to supply the cooling gas along such lower tower section in a non-uniform manner, and to enable the cooling gas to rise therefrom non-uniformly along said lower section and in an ascending direction so that an ascending, transversally non-uniform flow of cooling gas engages upwards along an upwardly moving portion of the glass sheet to effect a greater withdrawal of heat from such glass sheet in the central portion thereof than in the side edges of such glass sheet so as to produce a transverse curve of temperatures in such glass sheet portion different from that established therein in the upper portion of the drawing chamber.

5. Apparatus as defined in claim 4, in which said elongated means comprises means forming an elongated discharge chamber, and a plurality of conduits for delivering the cooling gas to such chamber.

6. Apparatus as defined in claim 5, in which said conduits extend into said discharge chamber from opposite ends of the latter and have discharge ends disposed in spaced opposed relation inwardly of the side edges of the glass sheet.

7. Apparatus as defined in claim 5, in which the discharge ends of said conduits are disposed in spaced relation along the length of said chamber inwardly from the side edges of the glass sheet and transversely to said glass sheet, said chamber forming means including means forming a baffle between the discharge ends of said conduits and the glass sheet.

8. Apparatus as defined in claim 5, in which said elongated means comprises means movably supporting said conduits to enable angular movement of the discharge ends thereof and thereby variation of the direction of discharge of the cooling gas relative to the glass sheet.

9. Apparatus as defined in claim 5, in which said elongated means comprises means slidably supporting said conduits to enable longitudinal adjustment of the discharge ends thereof relative to said discharge chamber.

10. Apparatus as defined in claim 5, in which said discharge chamber is provided with means for modifying the direction of flow of the cooling gas from said conduits into said chamber.

11. Apparatus as defined in claim 4, in which said elongated means includes means for measuring the transverse gradient temperatures of the glass sheet, said measuring means including a plurality of temperature sensing means located adjacent to one face of the glass sheet and disposed in spaced relation horizontal across the width of such sheet.

12. Apparatus as defined in claim 4, including guide means located above said elongated means for directing the ascending flow of cooling gas through the annealing tower along an upward path adjacent to the sheet in at least one zone and away from the sheet in other zones to cause such gas to engage a particular localized transverse portion of the glass sheet in a selected section of said tower section located above said lower section thereof.

13. Apparatus for annealing sheet glass as it is being drawn upwardly through a drawing chamber from a body of molten glass and having transverse temperature curves established therein during its movement through the drawing chamber, comprising an annealing tower positioned adjacently above the drawing chamber, means for drawing the glass upwardly through said tower, and means for introducing a cooling gas into the lower section of said tower including elongated means in said lower section in spaced relation to the rising glass sheet and disposed in substatially parallel relation to such glass sheet, said elongated means being constructed and arranged to distribute the cooling gas therefrom non-uniformly along said lower section and in an ascending direction so that an ascending, transversely non-uniform flow of cooling gas engages upwards along an upwardly moving portion of the glass sheet to effect a withdrawal of heat from such glass sheet portion according to a non-uniform transverse curve such as to produce a transverse curve of temperatures in such glass sheet portion different from that established therein in the upper portion of the drawing chamber, said elongated means comprising means forming a discharge chamber, and a plurality of conduits for delivering the cooling gas to such chamber, the discharge ends of said conduits being constructed to provide for a discharge of the cooling fluid therefrom transversely to the longitudinal axes of such conduit ends and comprising an outer tubular member, and an inner tubular member located inside said outer tubular member, said outer and inner tubular members having registerable discharge openings in the walls thereof, and at least one of said members being movable rleative to the other to vary the registration of such openings and therefore the effective area of the discharge of the cooling gas therethrough.

References Cited by the Examiner

UNITED STATES PATENTS

| | | | |
|---|---|---|---|
| 2,246,053 | 6/1941 | Magrini | 65—83 X |
| 2,928,213 | 3/1960 | Crandon | 65—194 |

FOREIGN PATENTS 102,275 10/1937 Australia.

DONALL H. SYLVESTER, *Primary Examiner.*

S. LEON BASHORE, A. D. KELLOGG,
*Assistant Examiners.*